United States Patent [19]
Fischer et al.

[11] Patent Number: 5,232,986
[45] Date of Patent: Aug. 3, 1993

[54] THERMOPLASTIC MOULDING COMPOSITION COMPRISING A POLYMER BLEND BASED ON POLY(METH)ACRYLATE(S), ABS-TYPE POLYMER AND POLYCARBONATE

[75] Inventors: Jens-Dieter Fischer, Bickenbach; Rudolf Blass, Darmstadt; Uwe Numrich, Weiterstadt; Werner Siol, Darmstadt-Eberstadt, all of Fed. Rep. of Germany

[73] Assignee: Rohm GmbH Chemische Fabrik, Darmstadt, Fed. Rep. of Germany

[21] Appl. No.: 975,118

[22] Filed: Nov. 12, 1992

Related U.S. Application Data

[63] Continuation of Ser. No. 692,600, Apr. 29, 1991, abandoned.

Foreign Application Priority Data

Apr. 28, 1990 [DE] Fed. Rep. of Germany ....... 4013700

[51] Int. Cl.⁵ .................. C08L 33/12; C08L 69/00; C08L 51/00
[52] U.S. Cl. .................................. 525/67; 525/71; 525/133; 525/148
[58] Field of Search .................. 525/67, 71, 133, 148

[56] References Cited

U.S. PATENT DOCUMENTS

| | | | |
|---|---|---|---|
| 4,440,905 | 4/1984 | Dunkelberger | 525/67 |
| 4,677,162 | 1/1987 | Grigo et al. | 525/67 |

FOREIGN PATENT DOCUMENTS

| | | |
|---|---|---|
| 0037686 | 10/1981 | European Pat. Off. . |
| 135492 | 3/1985 | European Pat. Off. . |
| 1263295 | 3/1968 | Fed. Rep. of Germany . |
| 3238228 | 4/1983 | Fed. Rep. of Germany . |
| 132143 | 12/1974 | Japan .................. 525/148 |
| 060151 | 4/1985 | Japan .................. 525/67 |

OTHER PUBLICATIONS

WPI, File Supplier, AN=74-85000V, Derwent Publications Ltd, London, GB; Abstract of JP-A-49 041 441 (Teijin Chems. Ltd) Apr. 18, 1974.

*Primary Examiner*—David J. Buttner
*Attorney, Agent, or Firm*—Oblon, Spivak, McClelland, Maier & Neustadt

[57] ABSTRACT

The invention relates to polymer blends, which can be processed like a thermoplastic, whose bulk A) (50 to 90 wt. %) is polymethylmethacrylate or a polymethacrylate resin; and which also contain 5 to 40 wt. % of, as component B), a tough polymer, in particular an ABS polymerizate; and contain 5 to 40 wt. % of, as component C), a polycarbonate or a polyester carbonate. By adding component C), the heat resistance, impact strength and notched impact strength are improved in the known polymethacrylate/ABS blends. With the addition of an impact modifying component D), contained in quantities of 0 to 20 wt. % in the polymer blend, the impact strength and notched impact strength can be further raised. Preferably, recycled polymers can be added as the polymeric mix components.

4 Claims, No Drawings

THERMOPLASTIC MOULDING COMPOSITION COMPRISING A POLYMER BLEND BASED ON POLY(METH)ACRYLATE(S), ABS-TYPE POLYMER AND POLYCARBONATE

This application is a continuation of application Ser. No. 07/692,600, filed on Apr. 29, 1991, now abandoned.

BACKGROUND OF THE INVENTION

1. Field of the Invention

The invention relates to polymer blends of poly(meth)-acrylates and ABS polymerizates, with improved thermal and mechanical properties, which are high strength materials that can be processed like a thermoplastic.

2. Description of the Prior Art

Polymethacrylates, both methylmethacrylate-homopolymers and -copolymers and acrylonitrile-butadiene-styrene (ABS) polymers are used widely in industry as polymers that can be processed like a thermoplastic. Blends of these two kinds of polymers are also industrially interesting combinations and could yield other interesting and useful blends, if specific thermal properties such as the softening temperature and the mechanical properties, primarily the notched impact strength, were improved. The need for such polymers exists, for example, for the manufacture of highly stressed moulded parts, in the construction of vehicles.

Thermoplastic compositions are known from the German Auslegeschrift 12 63 295; which discloses blends of polymers, and, in particular, an ABS polymer with subordinate quantities of a polymethylmethacrylate or a copolymer with at least 70 percent by weight of methylmethacrylate.

In European Published Patent Application 0 037 686 (equivalent to U.S. Pat. No. 4,440,905), thermoplastic blends comprising an elastomeric impact strength modifying polymer, e.g., an ABS polymer, in addition to another polymeric auxiliary agent, and one or more rigid matrix polymers such as methylmethacrylate-homopolymers and -copolymers or polycarbonate are claimed without detailed information.

Blends of a styrene-rich copolymerizate with ABS and/or MABS polymers and polycarbonate are described in European Published Patent Application 0 135 492 (equivalent to U.S. Pat. No. 4,663,389).

In German Offenlegungsschrift 32 38 228 (equivalent to U.S. Pat. No. 4,390,657), a thermoplastic composition is claimed that includes a polycarbonate resin, a copolymer comprising acrylonitrile, butadiene and an alkenyl aromatic compound like styrene, thus an ABS polymer, and a $C_1$-to $C_5$-acrylate or -methacrylate-interpolymer. The moulding composition contains a predominant amount of polycarbonate and small amounts of the acrylate-/methacrylate-interpolymer, i.e. a methacrylate polymer grafted on an acrylate rubber.

U.S. Pat. No. 4,667,162 describes a thermoplastic moulding composition comprising polycarbonate resin, an ABS polymer and an impact modifier based on acrylic rubber.

The specified prior art shows that the known blends of this kind always contain high percentages of styrene-rich polymerizates and/or high percentages of polycarbonate, wherein these polymer blends represent industrial compounds with poor weathering resistance, and in the case of a high polycarbonate content also poor flow and thus relatively high processing temperature.

SUMMARY OF THE INVENTION

The present invention is based on the problem of improving the heat resistance and simultaneously impact strength, and, in particular, the notched impact strength of polymer blends which comprise predominantly polymethylmethacrylate or corresponding (meth)acrylate copolymers and ABS polymerizates, and which can still be processed as moulding compositions.

The subject matter of the invention comprises thermoplastic moulding compositions comprising a polymer blend of A) 50 to 90 wt. % of polymethylmethacrylate or copolymer of a1) 50 to 100 wt. % of $C_1$ to $C_{10}$ alkyl-, $C_5$ to $C_7$ cycloalkyl- or $C_6$ to $C_{10}$ aryl-(meth)acrylate or mixtures thereof, a2) 0 to 20 wt. % of a monomer selected from the group consisting of (meth)acrylonitrile, (meth)acrylamide, hydroxyalkyl(meth)acrylate, maleic anhydride and maleic acid imides, a3) 0 to 50 wt. % of a vinyl aromatic monomer;

B) 5 to 40 wt. % of a copolymer of polybutadiene, as the viscous phase component, selected from the group consisting of ABS polymers, MBS polymers and MABS polymers;

C) 5 to 40 wt. % of c1) polycarbonate consisting of one or more structural units of the formula I

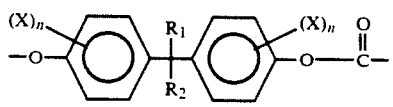

wherein $R_1$ and $R_2$=H, $C_1$-$C_6$-alkyl or $C_6$-$C_{12}$-aryl or —aralkyl

X is halogen, and n is 0, 1, 2, 3 or 4, and/or c2) polycarbonate cocondensates, comprising 5 to 95 wt. % of the structural unit I and 95 to 5 wt. % of o- and/or p-phthalic acid bisphenol ester units; and D) 0 to 20 wt. % of an impact modifier comprising d1) 90 to 20 wt. % of an elastomer with a glass temperature Tg<10° C., which is at least in part covalently linked to d2) 10 to 80 wt. % of a polymer comprising at least 80% of structural units of the formula II

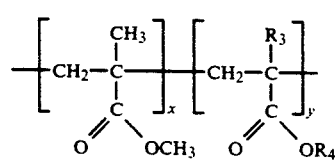

where $R_3$ stands for H or $CH_3$ and $R_4$ stands for an unsubstituted or substituted $C_5$ to $C_7$-cycloalkyl group or an aryl group having 6 to 12 carbon atoms, and x and y complement one another up to 100 wt. %, provided that y denotes a range from 0 to 50 wt. %.

DETAILED DESCRIPTION OF THE INVENTION

The present polymer blends are impact-modified moulding compositions with a poly(meth)acrylate content ranging from 50 to 90 wt. %. Depending on the polycarbonate content or polycarbonate cocondensate content, the heat resistance of these blends is 10° to 15° K. above the values for, e.g., polymethylmethacrylate/acrylonitrile-butadiene-styrene (PMMA/ABS) blends. Impact strengths and notched impact strengths are significantly increased in the products improved according to the invention. To prepare the polymer blends according to the invention, recycled components, partially or exclusively, can be used. Surprisingly, moulding compositions of virgin materials or recycled components according to the invention exhibit practically identical properties.

The blend components—PMMA or (meth)acrylate copolymers, ABS, and polycarbonate (PC)—accumulate as such or also as blends such as PC/ABS blends during waste reprocessing. PC/ABS blends are used as high strength materials, e.g., in the construction of vehicles, to manufacture shock absorbers or for other parts that can be highly mechanically loaded. The recycling of these blends presents a problem because, as moulding compositions, their relatively high processing temperatures (260°-300° C.) cause the polycarbonate to decompose and to a certain degree also the ABS.

The processing temperature is specified by the flow of the blends. Blends in accordance with the invention cause no problems due to high PMMA or (meth)acrylate copolymer content owing to their good flow at processing temperatures into mouldings. These mouldings, which are manufactured in an advantageous manner using recycled materials, can serve as commercial moulded parts, e.g., in the building of vehicles, for example, as parts of the lamp housings, or for housings for equipment.

The individual components of the polymer blends of the invention are well-known polymers, which are used industrially predominantly as moulding compounds.

Component A), which comprises the bulk of the new moulding composition in a quantity ranging from 50 to 90 wt. %, preferably 50 to 75 wt. %, is a polymethacrylate moulding compound. It comprises either only polymethylmethacrylate or copolymers of $C_1$ to $C_{10}$ alkyl-, $C_5$ to $C_7$ cycloalkyl- $C_6$ to $C_{10}$ aryl-(meth)acrylates or mixtures thereof, preferably copolymers of methyl methacrylate with about 2 to 20 wt. % of other $C_1$ to $C_{10}$ alkyl-, $C_5$ to $C_7$ cycloalkyl- and $C_6$ to $C_{10}$ aryl(meth-)acrylates or mixtures thereof. However, suitable A components also include other copolymers which were prepared with other comonomers, in particular other acrylic acid or methacrylic acid derivatives such as acrylonitrile, methacrylonitrile, acrylamide, methacrylamide, their functional derivatives such as hydroxyalkyl(meth)acrylates, e.g., 2-hydroxyethyl(meth)acrylate, or maleic acid compounds, such as maleic anhydride or maleic acid imides, where in accordance with a2) they are present in quantities ranging from 0 to 20 wt. % in the copolymers A).

As specified in a3), these copolymers can also contain 0 to 50 wt. %, of vinyl aromatics such as styrene, p-methyl styrene and α-methyl styrene as the comonomers. Thus, the A) component can be, e.g., an industrial moulding compound, comprising 75 wt. % of methylmethacrylate, 10 wt. % of maleic anhydride, and 15 wt. % of styrene, which at a vicat softening temperature of 120° C. (measured according to DIN 53 460) also gives the thermoplastic compounds of the invention their relatively high heat resistance.

The polymethacrylate component A) may be prepared by any known method through polymerization of the monomer(s) in bulk, in solution or in dispersion. By adding known regulators, primarily sulfur regulators, in particular mercaptans, the molecular weights of the polymethacrylates are controlled in such a manner that they can be processed as thermoplastic moulding compounds. (Kunststoff-Handbuch [Plastics Handbook], Vol. IX, Polymethacrylates, Carl Hanser Verlag, Munich 1975, pages 22 to 37).

Component B), present in the blends of the invention in a quantity ranging from 5 to 40 wt. %, preferably 10 to 30 wt. %, is a copolymer of polybutadiene, and functions as the viscous phase component. Suitable copolymers include the well-known ABS polymers. The ABS polymers (comprising acrylonitrilebutadiene-styrene) also include ABS-analog systems, in particular, MBS and MABS polymerizates, which as component B), in the polymer blends of the invention, determine the intrinsic viscosity of the compositions. MBS or MABS polymers ar two phase systems in which methylmethacrylate-styrene or methylmethacrylate-acrylonitrile-styrene copolymers are anchored on the polybutadiene as graft branches. The preparation of such ABS moulding compositions may be effected by various well-known methods. The preferred manufacturing process is emulsion polymerization. (Ullmann's Encyklopädie der technischen Chemie, 4th edition, Vol. 19, pages 277 to 293.

The improvement of properties, according to the invention, of known polymethacrylate-ABS-blends, in particular the improvement in heat resistance and impact strength, is obtained with the C) component in quantities ranging from 5 to 40 wt. %, preferably 15 to 35 wt. %, in the mixture. The preferred C) component is an aromatic polycarbonate c1) with one or more structural units of the formula I. Suitable thermoplastic, aromatic polycarbonates with high molecular weight, include homopolycarbonates and copolycarbonates in accordance with formula I and mixtures thereof, and have molecular weights ranging from about 10,000 to about 200,000 Dalton, preferably from about 20,000 to 80,000 Dalton. Such polycarbonates are well-known and are commercially available. 2,2-bis(4-hydroxyphenyl)-propane and bis(4-hydroxyphenyl)methane typify the divalent phenols used to prepare the aromatic polycarbonates. Halogen-substituted bisphenols can also be used to prepare the aromatic polycarbonates. The halogen-substituted bisphenols serve primarily to reduce the combustibility of the polycarbonates and thus also the blends of the invention. Halogen-substituted bisphenols include 2,2-bis-(3,5-dichloro-4-hydroxyphenyl)-propane and 2,2-bis-(3,5-dibromo-4-hydroxyphenyl)-propane.

The C) component added in the present invention may also include, as c2), polymeric derivatives of a divalent phenol with alternating quantities of carbonic acid and aromatic carboxylic acids, in particular o- and/or p-phthalic (terephthalic) acid. These transparent thermoplastics, commercially available as polyester carbonates, may be prepared, for example, as described in U.S. Pat. No. 3,169,121.

Suitable bisphenol polycarbonates include, for example, products that are commercially available under the name MAKROLON ® (Bayer); and the polyester carbonates include products that are commercially available under the name APEC ® (Bayer). Like components A) and B), the C) component is also added preferably as a recycled product, in order to prepare the compounds of the invention.

T further improve the impact strength of the blends of the invention, an impact modifier D) may be added in quantities ranging from 0 to 20 wt. %, based on the total weight of A)+B)+C)+D). Impact modifiers of the kind defined under D) comprise an elastomer with a glass temperature below 10° C., preferably below −10° C., that is connected covalently to a methacrylate-(co)-polymerizate. Such impact modifiers are well-known in the art and include those described in European Published Patent Applications 0 321 878 and 0 326 938.

The polymer blends of the invention are prepared by conventional methods (see Ullmann's Encyklopädie der technischen Chemie, 4th edition, Vol. 15, pages 281–285). In particular, the claimed blend may be obtained starting from the single components A), B) and C), and optionally D), or by starting from blends of A) with B) or from A) with C) or from B) with C), which optionally can also already include component D). Advantageously, and preferably, recycled substances are added. Following mechanical premixing of the granulated components, such a mixture is fed through an extruder or a roller compounder, thus obtaining a blend of the kind according to the invention. This mixed preparation can be cooled and then cut into granules, which are then used as the moulding composition.

Having generally described this invention, a further understanding can be obtained by reference to certain specific examples which are provided herein for purposes of illustration only and are not intended to be limiting unless otherwise specified.

EXAMPLES

In the following examples, the Vicat softening temperature (VST) is determined according to DIN 53 460 or ISO 306; the impact strength and notched impact strength are determined according to ISO 179 or DIN 53 453; and the measure for the flow, and thus for the thermoformability, is the melt viscosity, determined according to DIN 54 811.

EXAMPLES 1–4

The blends listed in the following table were compounded and granulated from mix components on a 35 mm Storck mixing extruder at 210°–240° C.; the injection was done on a Battenfeld injection moulding machine BA 350-CE at 240° C. As the mix components, polycarbonate MAKROLON ® 3103 or 1143 (Bayer) and acrylonitrile-butadiene-styrene terpolymer TERLURAN ® 877T (BASF), which has been already processed at least twice like a thermoplastic (recycled), and polymethylmethacrylate PLEXIGLAS ® Y8N or Y7N granules (Röhm) were added as virgin material. Compared to PMMA/ABS blends (comparison example 4), the blends exhibit a significantly higher heat resistance and notched impact strength. In contrast, the increase in melt viscosity and thus the decrease in flow (melt flow index, MFI) is negligible (an increase in the melt temperature of 5°14 10° K. reduces the melt viscosity by approximately 50% and thus to the level of the comparison example 4.

| Blend/Property | Component | Example 1 | Example 2 | Example 3 | Example 4 (Comparison) |
|---|---|---|---|---|---|
| | Polymethacrylate | 50% Y8N | 50% Y7N | 50% Y8N | 70% Y8N |
| | ABS | | 20% | | 30% ABS |
| | PC | Makrolon 3103 30% | | Makrolon 1143 30% | |
| Vicat-B (°C.) DIN 53460 | | 115 | 112 | 115 | 102 |
| Impact Strength (kjm$^{-2}$) ISO 179/1D | | | | | |
| 23° C. | | 71 | 89 | without fracture | — |
| −10° C. | | 82 | 81 | without fracture | — |
| Notched Impact Strength (kjm$^{-2}$) ISO 180/1A | | | | | |
| 23° C. | | 5.1 | 4.7 | 5.4 | 2.8 |
| −10° C. | | 3.5 | 3.4 | 3.0 | — |
| Melt Viscosity/5N (Pa s) DIN 54811 | | | | | |
| 220° C. | | 3 710 | 2 260 | 3 750 | 2 050 |
| 240° C. | | 820 | — | — | — |
| 260° C. | | 330 | — | — | — |
| MFI (230° C., 3.8 kg) DIN 53735 | | 2.0 | — | — | 2.5 |

EXAMPLES 5–8

As in Examples 1–4, the following listed blends were compounded and granulated on a Breyer mixing extruder and subsequently injection moulded on a Battenfeld injection moulding machine.

In Example 5 the properties of a mix comprising virgin materials are presented. Examples 6 and 7 describe blends, which contain an impact modifier based on butylacrylate (suspension polymerizate PLEXIGLAS ® zk50), where in Example 6 all of the components were added as virgin material, and in Example 7 the ABS and PC components were added as recycled materials. A blend with a lower polycarbonate content is described in Example 8.

The comparison between Examples 1, 3 and 5 shows that there are no significant differences between blends comprising recycled materials and virgin materials. By adding other impact modifiers the notched impact strength can be improved again by approximately 10–20% (Compare Examples 1–3 with 6 and 7).

| Blend/Property | Component | Example 5 | Example 6 | Example 7 | Example 8 |
|---|---|---|---|---|---|
| | Polymeth-acrylate | | 50% Y8N | | 65% Y8N |
| | ABS | | | 20% | |
| | PC | 30% Makrolon 3103 | 25% Makrolon 3013 5% Plexiglas zK50 | | 15% Makrolon 3103 |
| Vicat-B (°C.) DIN 53460 | | 116 | 116 | 114 | 113 |
| Impact Strength (kjm$^{-2}$) ISO 179/1D | | | | | |
| 23° C. | | — | without fracture | without fracture | 63 |
| −20° C. | | — | 85 | 81 | 45 |
| Notched Impact Strength (kjm$^{-2}$) ISO 180/1A | | | | | |
| 23° C. | | 5.3 | 6.1 | 5.7 | 2.9 |
| −20° C. | | 3.9 | 3.5 | 3.7 | 2.3 |
| Melt Viscosity/5N (Pa s) DIN 54811 220 Grad °C. | | 3 340 | 3 680 | 3 500 | 2 520 |

What is claimed as new and desired to be secured by Letters Patent of the United States is:

1. A thermoplastic moulding composition comprising a polymer blend of:
   A) 50 to 90 wt. % of polymethylmethacrylate or copolymer of
      a1) 50 to 100 wt. % of $C_1$ to $C_{10}$ alkyl-, $C_5$ to $C_7$ cycloalkyl- or $C_6$ to $C_{10}$ aryl-(meth)acrylate or mixtures thereof,
      a2) 0 to 20 wt. % of a monomer selected from the group consisting of (meth)acrylonitrile, (meth)acrylamide, hydroxyalkyl(meth)acrylate, maleic anhydride and maleic acid imides,
      a3) 0 to 50 wt. % of vinyl aromatic monomer;
   B) 5 to 40 wt. % of a copolymer of polybutadiene, as the viscous phase component, selected from the group consisting of ABS polymers, MBS polymers and MABS polymers;
   C) 5 to 40 wt. % of
      c1) polycarbonate consisting of one or more structural units of the formula I

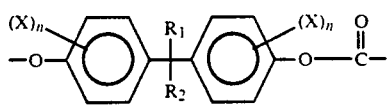

wherein $R_1$ and $R_2$=H, $C_1$-$C_6$-alkyl or $C_6$-$C_{12}$-aryl or —aralkyl,
   X is halogen, and
   n is 0, 1, 2, 3 or 4, and/or
      c2) polycarbonate cocondensates, comprising 5 to 95 wt. % of the structural unit I and 95 to 5 wt. % of o- and/or p-phthalic acid bisphenol ester units; and
   D) 5 to 20 wt. % of an impact modifier comprising
      d1) 90 to 20 wt. % of an acrylate elastomer with a glass temperature Tg < 10° C., which is at least in part covalently linked to
      d2) 10 to 80 wt. % of a polymer comprising at least 80% of structural units of the formula II

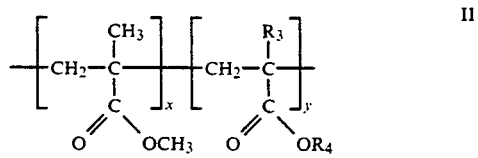

where $R_3$ stands for H or $CH_3$ and $R_4$ stands for unsubstituted or substituted $C_5$ to $C_7$-cycloalkyl group or an aryl group having 6 to 12 carbon atoms, and x and y complement one another up to 100 wt. %, provided that y denotes a range from 0 to 50 wt. %.

2. The thermoplastic moulding composition as claimed in claim 1, which contains component A) in proportions ranging from 50 to 75 wt. %, B) in proportions ranging from 10 to 30 wt. % and C) in proportions ranging from 15 to 35 wt. %.

3. The thermoplastic moulding composition as claimed in claim 2, wherein components A), B), C) or D) are recycled polymers.

4. A thermoplastic moulding composition according to claim 1 comprising 50% of component A, 20% of component B, 25% of component C, and 5% of component D.

* * * * *